United States Patent
Barrer et al.

(10) Patent No.: US 6,246,957 B1
(45) Date of Patent: Jun. 12, 2001

(54) METHOD OF DYNAMICALLY GENERATING NAVIGATION ROUTE DATA

(75) Inventors: John N. Barrer, Washington, DC (US); Joyce R. Forman, Herndon, VA (US); George W. Flathers, Rixeyville, VA (US); Daniel P. Greenbaum, Ashburn, VA (US)

(73) Assignee: The Mitre Corporation, McLean, VA (US)

( * ) Notice: Subject to any disclaimer, the term of this patent is extended or adjusted under 35 U.S.C. 154(b) by 0 days.

(21) Appl. No.: 09/541,076

(22) Filed: Mar. 31, 2000

(51) Int. Cl.[7] ..................................................... G01C 21/00
(52) U.S. Cl. ............................................................ 701/202
(58) Field of Search ................................... 701/202, 206, 701/208, 209, 210, 218; 340/286.14, 977, 995; 342/551, 452

(56) References Cited

U.S. PATENT DOCUMENTS 4,692,869 * 9/1987 King et al. ............................ 701/206
6,128,574 * 10/2000 Dickhans ............................ 701/209

* cited by examiner

Primary Examiner—William A. Cuchlinski, Jr.
Assistant Examiner—Marthe Y. Marc-Coleman
(74) Attorney, Agent, or Firm—Rosenberg, Klein & Lee

(57) ABSTRACT

There is provided a method and system for automatically generating navigation route data for a vehicle. The method and system provide for storing in computer readable form at least one path object having a predetermined path object type which corresponds to a distinct predefined path type; and, for selectively reading and executing at least one such path object to generate a composite navigation route for guiding the given vehicle's travel. The composite navigation route may be formed by one or more path components defined by the path object. Each path object includes a plurality of defining parameters for geometrically configuring each path object's corresponding path type to form at least one specific path component. Each path object also includes a predetermined set of instructions for geometrically rendering its path component in accordance with the defining parameters.

25 Claims, 20 Drawing Sheets

Line Segment

- [L1,P1,P2]
- Algorithm:
  - Proceed to P1,
  - Fly directly to P2

Line Segment

- [L2,P1,c,d]  (constant altitude)
- Algorithm:
  - Proceed to P1
  - Fly course "c" for "d" nm
  - calculate P2

Turn T1

- [t1,P1,P2,P3]
- Algorithm:
  - Proceed to P1,
  - fly directly to P3,
  - at P3, turn toward and
  - fly directly to P2

Turn T2

- $[T2, P1, P2, \beta, \alpha]$
- Algorithm:
  - Proceed to P1,
  - calculate course C1as, P1-P2 minus $\beta$
  - fly from P1 along the course C1 until the relative angle between the aircraft and P2 is $\alpha$,
  - turn toward, and fly directly to P2.

Turn T3

- [T3, P1, α, d1, β, d2]
  (Constant altitude)
- Algorithm:
  – Proceed to P1
  – turn to magnetic course α
  – fly a distance d1
  – turn to magnetic course β,
  – fly distance d2.

TURN T4

- [T4, P1, P2, P3, r]
- ALGORITHM:
  - PROCEED TO P1
  - FLY DIRECTLY TO P3
  - CALCULATE CIRCLE OF RADIUS, r, WITH CENTER ON PERPENDICULAR TO P1-P3, AT P3, ON SAME SIDE OF P1-P3 AS P2.
  - FLY ALONG CIRCLE UNTIL ON COURSE HEADING DIRECTLY TO P2,
  - FLY DIRECTLY TO P2

Path Extension 2

[Dly2, P1, P2, D]

- Fly to P1
- Calculate point E so that :
  - $|P1 - E| = |E - P2|$
  - $|P1 - E| = [D + |P1 - P2|] / 2$
- Fly to E and then to P2

S-Turn Maneuver

- [ST1,P1,A,P,C]
- Algorithm:
  - Fly to P1
  - Calculate point c, 1/2 P along course C from P1
  - Calculate points b and d, 1/4 and 3/4 P, from P1
  - At P1, Turn left (right, if a is <0), fly smooth turns through b,c,and d
  - return to course C.

HOLDING PATTERN R1

- [R1,P1,P2,a]
- ALGORITHM:
  - PROCEED TO P1 ALONG COURSE "a"
  - CALCULATE CORNERS OF RECTANGLE HAVING P1 AND P2 ON OPPOSITE CORNERS
  - CALCULATE D1, THE DISTANCE FROM P1 TO THE SIDE CONTAINING P2
  - AT P1 TURN TOWARD P2 ON CIRCULAR PATH OF DIAMETER D1,
  - FLY DIRECTLY TO P2 ON REVERSE COURSE, a+180
  - AT P2, TURN TOWARD P1 ON CIRCULAR PATH OF DIAMETER D1
  - REPEAT ALGORITHM

Procedure Turn P1

- [PT1, P1, P2]
- Algorithm:
  - Fly to P1
  - Calculate Course P1-P2
  - fly along P1-P2 until 3 nm from P2
  - turn left 30 degrees, fly 4 nm
  - turn right 180 degrees along arc of circle having 1.5 nm diameter
  - fly to P2
  - turn right to reciprocal course, P2-P1,
  - fly to P1

Traffic Pattern

- [TP,P1,a,D1,D2,D3]
- Calculate:
  b from (P1,a,D1)
  p2 from (b,a,D3)
- Fly to p2
- Fly from p2 on course a+180 for distance D3+D2
- turn toward P1 on circular arc of diameter D1
- fly to P1 on course "a"

STAR Construction

- $[ST1, P1, P2, P3, a, d, h, l_1, a_1, t_1, l_2, a_2, t_2, \ldots l_n, a_n, t_n]$
- Proceed to P1
- If h=1, fly holding pattern 1. When finished,
- Fly directly to P3
  - Calculate Distance D1 between P2 and course "a" through P3
  - Calculate point "b" on perpendicular to course "a" through P2
- Turn and fly along course "a" to point "b", then for distance "d" along course "a"
- Turn towards P2 along circle of diameter D1,
- Fly directly to P2
- There are "n" altitude restrictions. The $l_i$'s are distances measured along the path from P1. The $a_i$'s are altitudes and the $t_i$'s are types. The types are: 1- "at", 2- "at or above", 3- "at or below", 4- "suggested"

FIG. 4E

TrafficPattern – Define Curve –– Case 1–1 point on curve with at least one defined leg

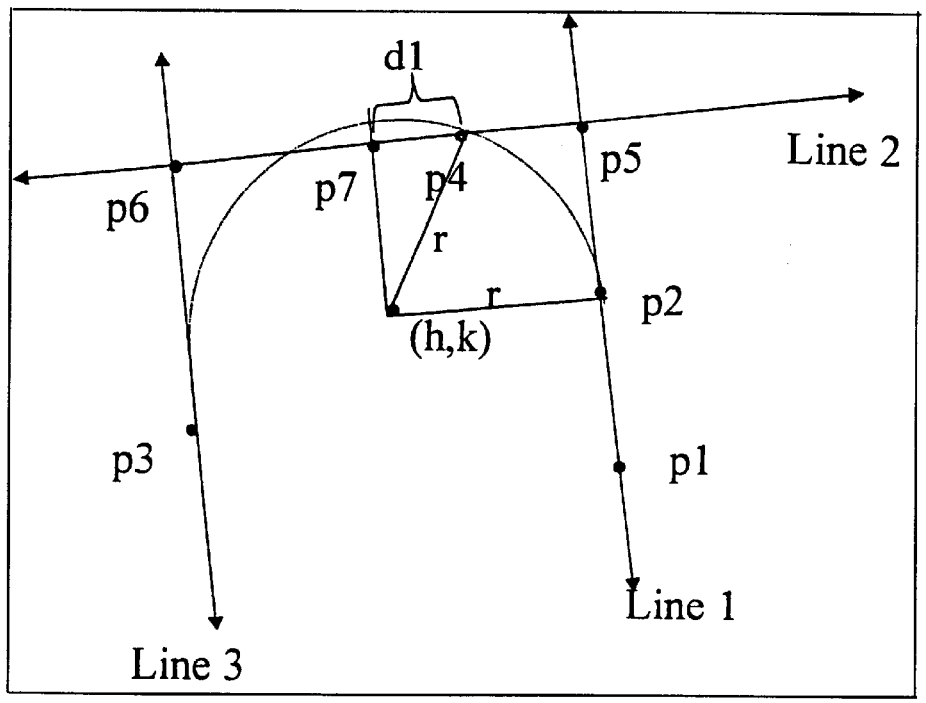

point p1 = point of defined leg farthest from curve
point p2 = point of defined leg nearest curve
point p3 = point on undefined leg
point p4 = point on curve
line_1(p1,p2)
line_2 = normal to line_1 through p4
line_3 = parallel to line 1 through p3
point p5 = intersection of line_1 and line_2
point p6 = intersection of line_2 and line_3
if distance from p5 to p6 = 0, then
  not a traffic pattern
line segment s1(p5,p6)
point p7 = midpoint of s1
diameter = s1 length
radius = diameter/2
distance d1 = distance from p7 to p4
if distance from p4 to p6 > diameter or distance from p4 to p5 > diameter, then
  not a traffic pattern

FIG. 8A distance d2 = (radius^2-d1^2)^(1/2)
point center = move p7 distance d2 along heading from p2 to p1
line_4 = normal to line_1 through center
point p8 = intersection of line_4 and line_1
point p9 = intersection of line_4 and line_3
line segment s2(p8,p9)
if p3 and p3 are not on opposite sides of s2 or p4 and p3 are not on opposite sides of s2,
   then not a traffic pattern TrafficPattern — Define Curve —— Case 2-1 point on curve with no defined legs

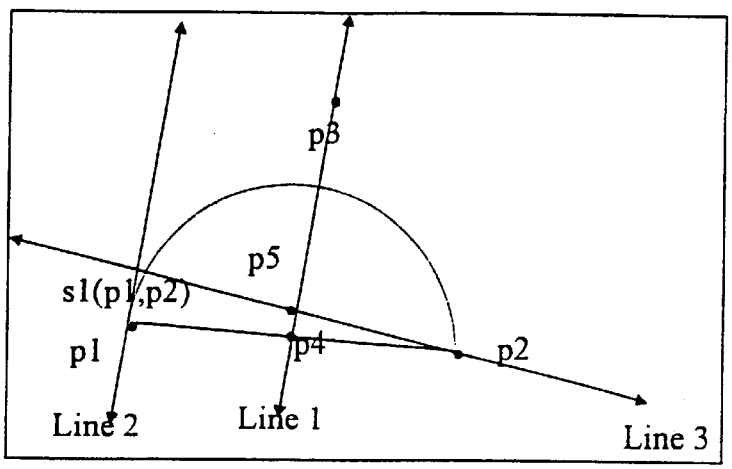

point p1 = point on entering segment
point p2 = point on exiting segment
point p3 = point on curve
line segment s1(p1,p2)
point p4 = midpoint of s1
line_1(p3,p4)
line_2 = parallel to line_1 through p1
line_3 = normal to line_1 through p2
point p5 = intersection of line_1 and line_3
diameter = distance from p2 to line_2
radius = diameter/2
d1 = distance from p5 to p3
if d1 < radius then
        not a TrafficPattern
center = move p3 distance radius along heading from p3 to p4
TrafficPattern — Define Curve —— Case 3-2 points on curve with at least 1 defined leg

FIG.8B

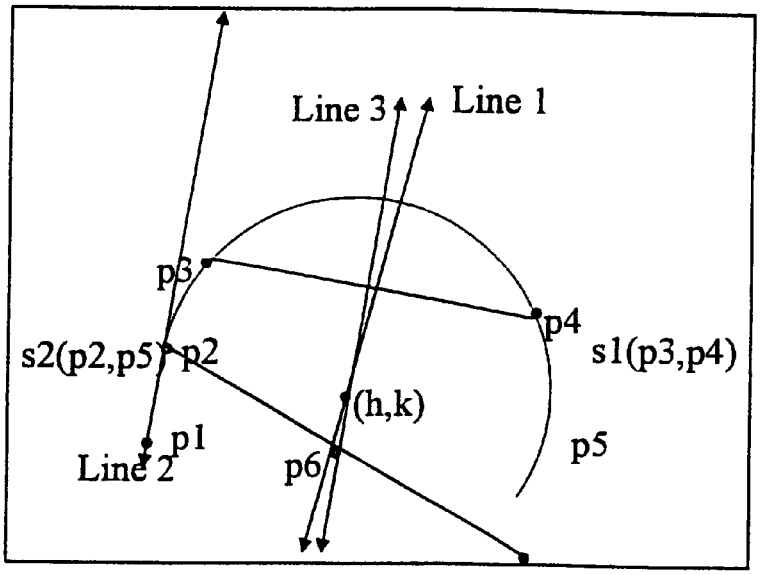

point p1 = defined segment point farthest from curve
point p2 = defined segment point nearest curve
point p3 = point on curve nearest defined segment
point p4 = point on curve farthest from defined segment
point p5 = point on undefined segment
line segment s1(p3,p4)
line segment s2(p2,p5)
point p6 = midpoint of s2
line_1 = normal to s1 through midpoint
line_2(p1,p2)
diameter = distance from p5 to line_2
radius = diameter/2
line line_3 = parallel to line_2 through p6
if line_1 and and line_3 do not intersect, then
    not a TrafficPattern
center = intersection of line_1 and line_3

FIG. 8C

TrafficPattern – Define Curve -- Case 4-2 points on curve with no defined legs

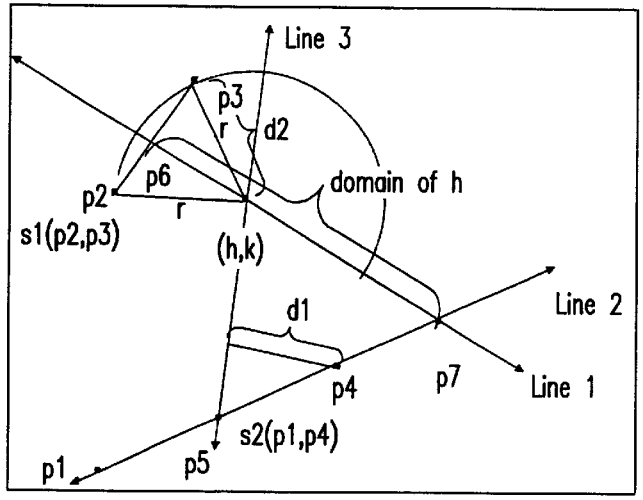

point p1 = point on exiting segment
point p2 = point on curve nearest entering segment
point p3 = point on curve nearest exiting segment
point p4 = point on exiting segment
line segment s1(p2,p3)
line_1 = normal to s1 through midpoint
line segment s2(p1,p4)
point p5 = midpoint of s2
point p6 = midpoint of s1
line line_2(p1,p4)
point p7 = intersection of line_1 and line_2 if line_1 is vertical,
then radius = distance from p6 to line (p5,p4)
point center = move p6 distance radius in direction from p6 to p5
else
center x coordinate h is between p6.x and p7.x, is on line_1, and is on a line passing through p5
distance d1 = $|[(k-p4.y)*(p5.x-h)-(h-p4.x)*(p5.y-k)]/[(p5.x-h)^2 + (p5.y-k)^2]^{(1/2)}|$
distance d2 = $[(p3.x-h)^2+pow(p3.y-k)^2]^{(1/2)}$
using line search algorithm
vary h and k until d1=d2

TrafficPattern – Define Curve -- Case 5 – at least 3 points on curve
define circle from 3 points (3 points define unique circle)

FIG. 8D

PathStretchingManeuver Try( )

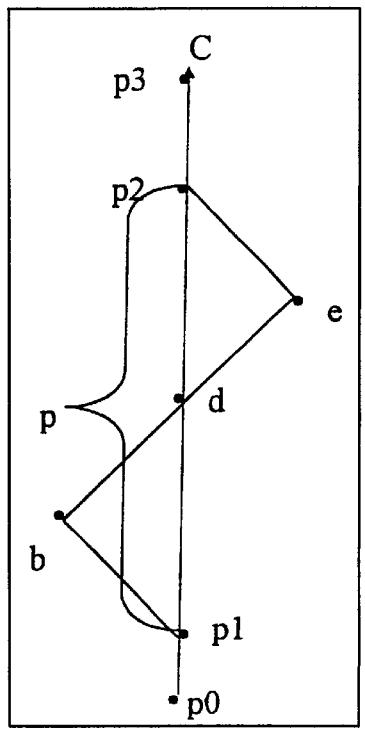

generate all point combinations
if first two and last two points in sequence are not collinear, then
  not a PathStretchingManeuver
line segment original path(p0,p3);
b_distance = distance from b to original path
e_distance = distance from e to original path
if b and e not > 0 or b and e not equidistant from original path, then
  not a PathStretchingManeuver
if b and e on opposite sides of original path, then
  not a PathStretchingManeuver
line segment p1_b(p1,b)
line segment b_e(b,e)
line segment e_p2(e,p2)
if length of p1_b = length of e_p2 or length of p1_b = 1/2*length of b_e, then
  not a PathStretchingManeuver
for all unused points in sequence, if any unused point is not on a segment of the path, then
  not a PathStretchingManeuver
otherwise
  return it IS a PathStretchingManeuver

FIG.9

METHOD OF DYNAMICALLY GENERATING NAVIGATION ROUTE DATA

BACKGROUND OF THE INVENTION

FIELD OF THE INVENTION

The subject method of dynamically generating navigation route data is generally directed to a system for making available a route to be followed by a host vehicle. More specifically, the subject method is one wherein the information sufficient to unambiguously define a given route, or path of travel, is pre-stored, then subsequently retrieved and processed to geometrically render the route when needed.

In virtually all vehicle navigation system applications, a distinct path to be followed by the vehicle is defined by a series of way points expressed in appropriate coordinates of a given reference system, or as a string of vectors extending between such coordinates. The vehicle attempts, either in automatically or manually guided manner, to travel successively through each way point, beginning with the first and ending with the last. Such way point-defined paths are heavily utilized in air traffic control applications, for instance, to direct aircraft through airport/runway arrival/approach and departure routes.

While they are typically defined quite distinctly, routes to be flown may invariably be categorized into one or more sets delineating generally identifiable path types. A particular route path, for instance, may be of such type as: line segment, S-turn maneuver, path extension, holding pattern, or the like. Despite sharing geometric attributes, however, distinct route paths of the same general type normally contain significantly different way point coordinates, as each is defined in a manner specific to a particular locale. Even within a common locale, route paths of the same general type may differ significantly in their constituent way point coordinates, where they are to actually be traveled by a host aircraft at different dates or times.

Consequently, aircraft vehicles typically have pre-stored within their onboard flight management system (FMS) or area navigation (RNAV) computers complete sets of way points peculiar to each of its origination and destination airports/runways. The pre-storing of such way point coordinate sets may be effected on the ground well before take-off, or even uploaded during flight through a suitable communications link, if available. Regardless, the entire set of way points for each distinct path that the given aircraft vehicle may be required to fly at the given locales is fully pre-stored and made accessible in the vehicle's FMS a priori.

The resulting mass of data to be stored and managed is quite excessive. Not surprisingly, a worldwide base of such data may be maintained only at enormous costs. The massive set of data consumes an inordinate share of hardware, software, and labor resources which in many applications may already be all too scarce in availability. In some cases, as in aircraft built before, say, 1990, the resources necessary to store the entire set of data for even one trip are typically not available.

The mass of data, moreover, serves unavoidably to inhibit and undermine operational factors that ultimately bear heavily upon both safety and cost concerns. The cumbersome amount of data needed to unambiguously define particular approach paths, for example, makes rather daunting the task of replacing an existing path definition with an updated, corrected, or otherwise modified path definition. This is especially so where the task is to be attempted during flight—over an available data exchange link established with a remote site or vehicle. The difficulty of the task is compounded in such cases by the need to transfer the necessary data in a sufficiently short time through radio wave traffic that, particularly in the vicinity of airports, may be extremely heavy.

It may not be possible in a given case, then, to insure a complete transfer of what may be the most critical path modifications or updates - the most recent ones. Consequently, an approaching aircraft may be left without the data to effect the late stage modifications required by factors like shifting weather conditions, equipment failure, or any of numerous other exigencies likely to affect traffic. Such inability to adapt to changing circumstances yield significant inefficiencies in the traffic flow in and through a given area.

Closely related to the lack of adaptability prevailing in existing systems is the difficulty of maintaining system integrity. In applications like air traffic control, effectively maintaining overall system integrity rests heavily upon effectively maintaining both data integrity and intent integrity. In terms of data integrity, the excessive amount of data necessarily maintained in a given aircraft's navigation computer and/or exchanged through available communications links introduces a proportionately high risk of unavoidable random error. Each additional electronic data element stored, received, or otherwise handled, for example, introduces an additional source of potential data corruption. Moreover, the weight of the workload in manipulating such excessive amounts of data not only strains system resources, it strains the personal resources of a pilot or other human operator. Of pertinent note in this regard is that the world's aircraft navigation database is currently updated and replaced every 28 days.

Overseeing and effecting the exchange of path, or route, way point information with an ATC ground station, for example, is rendered highly labor-intensive by the excessive amount of data involved. This unduly heightens the system's exposure to human error in the form of the operator either being too preoccupied with other onboard tasks to pay adequate attention to the given system task or, conversely, too preoccupied with the given system task to pay adequate attention to the other necessary onboard tasks. Directly or indirectly, a compromise of data integrity would invariably result in such cases.

In addition to data integrity, it is important that intent integrity be maintained. That is, the particular path that the given vehicle itself 'intends' to follow and the particular path that the ground-based control station system 'intends,' or expects, the vehicle to follow must be one and the same. Without the adaptability in existing systems to afford the rapid and reliable exchange of path information between a vehicle and a traffic controlling ground station, maintaining this intent integrity presents a significant challenge. If the uniquely-prescribed way point definitions for the set of available paths at a given airport have been at all modified since their last definition or update for charting purposes, a vehicle may very well be operating with an outdated version of one or more such way point path definitions, and may therefore unwittingly deviate from the control station-designated path.

The situation may be aggravated where, as at many airports, certain of its paths are defined in terms of local coordinates relative to locally-positioned navigational aids such as VHF omnidirectional radial range (VOR) devices, rather than in terms of absolute coordinates. Such lack of reference standardization only adds to the potential for confusion between the aircraft and the ground station.

Not surprisingly, there continues to be an effort by some in the art to limit the number of different paths/routes available for approach to and departure from each airport. This, however, would further constrict the adaptability of a system already plagued by the absence of sufficient adaptability.

Even where available system resources and applicable conditions would permit the required exchange of data between a vehicle and the ground station to check integrity, a meaningful check of way point-defined paths would yet require a great number of data elements to be exchanged. Thus loaded down by excessive data content, the vehicle's onboard system may be left without the adequate availability of resources to update the aircraft's intended path or effect other remedial action, even if a disparity between the aircraft-intended and the ground base-expected paths were correctly detected.

Another factor bearing on navigation system safety and cost concerns is that of standardization. As briefly alluded to in preceding paragraphs, the prevalent approach of defining each distinct path by the entire set of its constituent way points is hardly conducive to universal standardization. While the additional impediments to standardization due to expression of way points relative to localized navigational aid devices may in certain cases be substantially mitigated by the prevailing use of Global Positioning System (GPS) receivers on vehicles; the need to maintain a cumbersome definition for each and every distinct flight path would nevertheless limit the effectiveness of the standardization effort. As a practical matter, the gains to be had from a standardized reference for expressing and exchanging flight path data would ineffectually offset the persistent burden of maintaining each flight path prestored in a given aircraft's navigation computer, particularly the burden of maintaining each in an up-to-date manner. Failure to so maintain the path data base would immediately invoke the problems discussed in preceding paragraphs.

There is, therefore, a need for a method or system for providing vehicle navigation path, or route, data that overcomes the efficiency, adaptability, integrity, and standardization problems encountered by existing methods and systems.

PRIOR ART

Computerized systems for processing sequences of positional coordinate points for navigation of a vehicle are known, as are computerized systems for generally rendering geometric shapes. The prior art specifically known to Applicant includes: U.S. Pat. Nos. 5,406,491; 5,315,297; 4,841,292; 5,347,469; 5,751,289; 5,017,141; 4,835,532; 5,745,863; 5,815,118; 5,072,218; 5,732,192; and, 4,645,459. None of the systems disclosed in such art, however, provide for automatically generating a vehicle's navigation route data wherein one or more computer executable path objects respectively indicative of geometric path components are employed. Hence, none of the prior art systems discloses employing such path objects for the rendering of path components necessary to adequately define the vehicle's route. There is no method or system heretofore known which facilitates the convenient and efficient provision of navigation route data to a given vehicle in this manner.

SUMMARY OF THE INVENTION

It is a primary object of the present invention to provide a method and system for generating navigation route data defining the path of travel for a given vehicle.

It is another object of the present invention to provide a method for constructing a route path in accordance with one or more predetermined path type classifications.

It is another object of the present invention to provide a method for automatically defining a route path for a vehicle in a path object domain from a corresponding definition therefor in a coordinate point sequence domain.

It is yet another object of the present invention to provide a method for minimizing the number of parameters for unambiguously defining a given route path for a vehicle.

These and other objects are attained in accordance with the present invention by the subject method and system for generating navigation route data. The subject method generally comprises the steps of establishing a predefined reference system; storing in computer readable form at least one path object having a type selected from a plurality of predetermined path object types; and, selectively reading and executing at least one path object to generate a composite navigation route formed by at least one path component for guiding the travel of the vehicle. Each path object includes a plurality of defining parameters for configuring the path type corresponding thereto, so as to define a specific path component. Each path object also includes a predetermined set of instructions for geometrically rendering the path component in accordance with the defining parameters.

Where required by a particular application, one embodiment of the method and system provides also for the step of generating a series of way point coordinates within the reference system upon the execution of one or more path objects. The series of way point coordinates would substantially describe the geometrically rendered path components of the executed path objects.

In a preferred embodiment of the subject method and system, the path types corresponding to the predetermined path object types include at least one curvilinear geometric pattern and at least one polygonal geometric pattern. The predetermined set of instructions of a path object in such embodiment collectively prescribe a sequential trace of the corresponding path component. The path types corresponding to the predetermined path object types may include: a line segment, a turn, a path extension pattern, a maneuver pattern, a holding pattern, a procedure turn pattern, a traffic pattern, a generalized standard instrument arrival route pattern, and a generalized standard instrument departure route pattern, and the like.

BRIEF DESCRIPTION OF THE DRAWINGS

FIG. 4E is a continued listing of supplemental comments pertaining to the graphic portion of the illustration shown in FIG. 4D;

FIG. 8A is a graphic illustration of an exemplary geometric curve correlation process implemented in one portion of the flow diagram shown in FIG. 7 for a first illustrative case;

FIG. 8B is a graphic illustration of the exemplary curve correlation process shown in FIG. 8A for a second illustrative case;

FIG. 8C is a graphic illustration of the exemplary curve correlation process shown in FIG. 8A for a third illustrative case;

FIG. 8D is a graphic illustration of the exemplary curve correlation process shown in FIG. 8A for a fourth illustrative case; and, FIG. 9 is a graphic illustration of another exemplary geometric curve correlation process that may be implemented by a portion of the flow diagram shown in FIG. 6.

DETAILED DESCRIPTION OF THE PREFERRED EMBODIMENTS

Navigation route data for a vehicle has typically been defined heretofore by a sequence of positional coordinate points, such as way points, which trace a multi-dimensional path. The subject method and system (hereinafter referred collectively as "system") for generating navigation route data generally defines the data through one or more computer-readable formulations which are capable of collectively rendering in accordance with a predetermined set of defining parameters a multi-dimensional path that might otherwise be traced by a way point sequence. In typical applications, the subject system transforms a pre-established input sequence of way points to one or more such computer readable formulations. The system may in those applications receive the sequence of way points represented in any one of the formats conventionally employed in the art, such as in latitude/longitude coordinates and altitude values (where a 3-dimensional reference frame is employed).

Preferably, the system generates the computer-readable path formulations as path objects, each having a predetermined number of defining parameters. The resulting path objects may then be transmitted to or stored at a host vessel for either direct processing by the vessel's navigation control system, or for later recapture of the original way point sequence immediately prior to processing by the host vessel's navigation control system.

Depending on the requirements of a particular application and the resources available, the subject system may be implemented with one of several general configurations, examples of which are briefly illustrated in FIGS. 1A–1D. In a given application, the subject navigation route data generation system 10 may include simply an onboard component disposed aboard the host vessel, or both an on-board component as well as a remote, off-board base component with which it communicates over a data link.

Figure 1A:
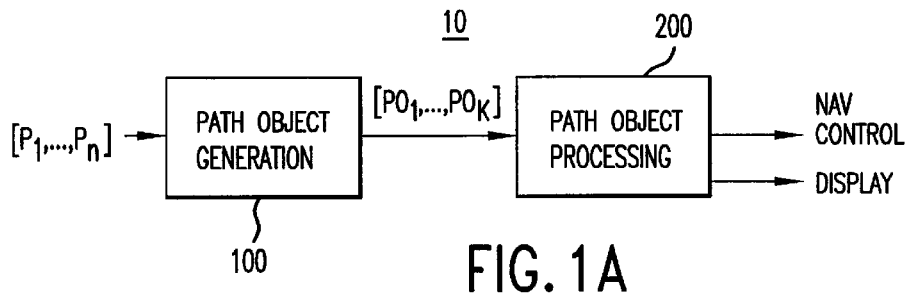
FIG. 1A is a block diagram illustrating a first embodiment of the present invention.
Figure 1B:
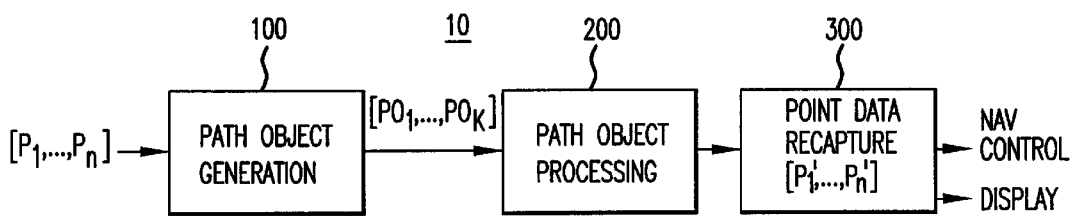
FIG. 1B is a block diagram illustrating a second embodiment of the present invention.

Referring to FIGS. 1A and 1B, system 10 includes onboard the host vessel a path object generation unit 100 which receives one or more sequences of way point data $[P_1, \ldots, P_n]$ and generates one or more corresponding path objects $[PO_1, \ldots, PO_k]$. Each path object $[PO_1, \ldots, PO_k]$ is computer readable and of a type selected from a plurality of path object types, each of which corresponds to a distinct curvilinear or polygonal path type. Each path object $[PO_1, \ldots, PO_k]$, moreover, includes: a set of defining parameters which serve to geometrically configure the path object's path type to a specifically-defined path component; and, a predetermined set of computer-executable instructions for geometrically rendering the path component in accordance with the defining parameters.

System 10 also includes onboard the host vessel a path object processing unit 200 operably coupled to path object generation unit 100 to receive the generated path objects $[PO_1, \ldots, PO_k]$ therefrom. Path object processing unit 200 selectively reads and executes the path objects to generate a composite navigation route formed by the path components of the executed path objects. Path object processing unit 200 generates the appropriate data to convey the composite navigation route information to the given vehicle's navigation control system and/or to any video display means on which a graphic representation of the composite navigation route may be presented for various users. The form and content of the data by which transfer of the composite navigation route information and/or display means is effected may be suitably established in accordance with the specifications and requirements of the given navigation control system and/or display means. Accordingly, any suitable interface means known in the art may be employed for this purpose.

Where, as in the case of FIG. 1B, the host vehicle is equipped with a navigation control system fixed in configuration to recognize navigation route data only in the form of way point sequences, system 10 further includes onboard the host vessel a point data recapture unit 300. Point data recapture unit 300 generally serves to re-convert on an as-needed basis the path components rendered by selected ones of the path objects $[PO_1, \ldots, PO_k]$ substantially back to the point data corresponding thereto. It is the sequence of geographic data points [P'$_1$, . . . , P'$_n$] recaptured from the path objects, then, that is passed to the navigation control system.

In the embodiments shown in FIGS. 1A and 1B, the input of numerous path-defining way point sequences [P$_1$, . . . , P$_n$] to path object generation unit 100 will typically occur through a temporary data link established therewith at some point before the host vessel actually embarks on its journey. Path object generation unit 100 would then store the path object data generated responsive to the input way point sequences, rather than the entire point data content of those numerous way point sequences. Available system resources would thus, among other things, thus be saved the burden of a cumbersome data load.

Depending on the particular application intended, the point data may be geographic positioning points expressed in coordinates of an absolute or a local reference system. In surface applications, for instance, they may be expressed in two-dimensional latitude/longitude coordinates; whereas, in airborne applications, they may be expressed in latitude/longitude and altitude coordinates. In accordance with the present invention, the burden on available system resources is significantly mitigated by replacing the point-by-point vessel route definitions otherwise maintained in a limited capacity storage medium with a predetermined set of path objects which, when processed responsive to their customizing parameters, yields a geometric rendering of the route/path to be traveled by the vessel. The vessel's navigation control facilities may then operate directly responsive to such geometric rendering, or responsive to the way point data sequence recaptured from such geometric rendering.

Figure 1C:
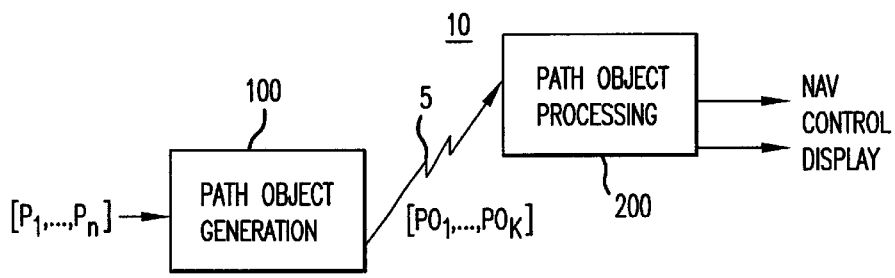
FIG. 1C is a block diagram illustrating a third embodiment of the present invention.
Figure 1D:
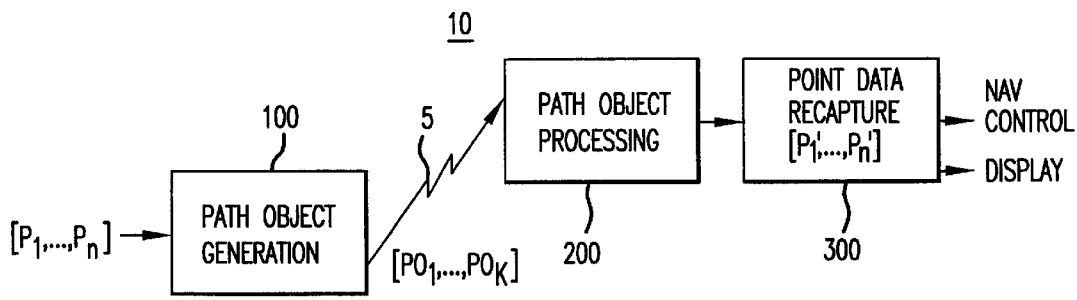
FIG. 1D is a block diagram illustrating a fourth embodiment of the present invention.

Referring now to FIGS. 1C, 1D, the subject system 10 includes in those configurations a base component disposed remotely from the host vessel. In the configuration of FIG. 1C, path object generation unit 100 is disposed, for instance, at a ground station; and, the path objects [PO$_1$, . . . , PO$_k$] generated thereby from one or more received way point sequences [P$_1$, . . . , P$_n$] are transmitted via a data link 5 established with the path object processing unit 200 onboard the host vessel. Path object processing unit 200 receives and stores the transmitted path objects for subsequent execution. In the configuration of FIG. 1D, an onboard component is also provided in the form of a point data recapture unit 300 which reconverts the path components rendered by selected ones of the received path objects [PO$_1$, . . . , PO$_k$] into way point sequences [P'$_1$, . . . , P'$_n$] for the less advanced navigation control system of the given vessel.

In the field of airborne navigation in which the subject navigation route data generation system finds its primary application, the specific paths to be traveled by a given aircraft at or near airports and other facilities are governed under applicable rules of aviation. Accordingly, the geometric shapes of the paths to be flown, as currently defined by corresponding sequences of way points, may generally be classified into one of several path types, from simple line segments to turns and more complex patterns such as holding, procedure turn, traffic, generalized standard instrument arrival route, generalized standard instrument departure route, and the like. The range of possible routes that may be properly flown by aircrafts throughout the world may then be defined generally by a finite number of such path types. In accordance with the present invention, a given way point-defined route to be flown by an aircraft is decomposed to one or a set of path objects corresponding to one or more path types specifically characterized, or customized, respectively by predetermined sets of defining parameters. When a path object is processed, its defining parameters provide the data necessary for accurate geometric configuration and geographic positioning to occur in the rendering of the corresponding path.

Preferably, the path objects are each formulated as computer executable objects in accordance with a suitable object-oriented programming technique known in the art, coded in any suitable language known in the art. As such, each path object, when processed, fully renders and appropriately orients its corresponding geometric path component. The rendered path may then be made available for display to a pilot or other operator of a given system component, in addition to being made available for use by the aircraft's navigation control system.

In accordance with the present invention, any finite number of path object types may be formulated for access in a given application. The number and complexity of the path objects will vary depending on factors such as available system resources, operational requirements and constraints, the performance specifications of the host vessels, and the degree to which remote transmission of data to/from a remote base station is necessary. In the exemplary case of international civil aviation, an illustrative set of path objects may include those shown in FIGS. 2A–B, 3A–F, and 4A–D. Each of these path objects are shown only for illustrative purposes, and the present invention is not limited either in number or individual configuration to the objects illustrated therein. In other applications, even within the international civil aviation application, any other set of suitably formulated path objects may be employed.

Figure 2A:
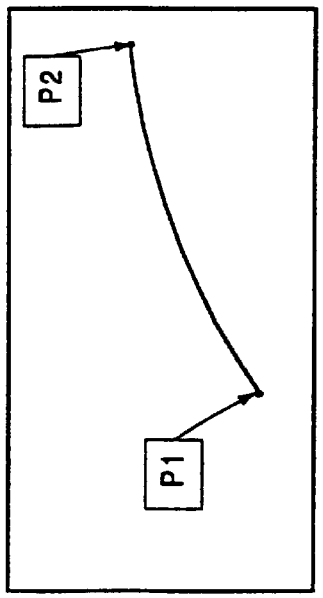
FIG. 2A is an illustration of a first exemplary line segment path component that may be rendered by a path object in accordance with the present invention.
Figure 2B:
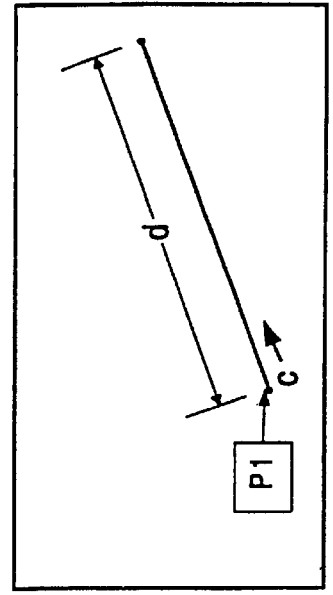
FIG. 2B is an illustration of a second exemplary line segment that may be rendered by a path object in accordance with the present invention.

Turning now to FIGS. 2A–B, 3A–F, and 4A–D, the path objects in the embodiment shown may be grouped into three general categories: line segments, turns, and patterns. Exemplary line segment path objects are shown in FIGS. 2A–B. The line segment path object designated L1 of FIG. 2A includes the defining parameters P1 and P2 which denote the end points for the corresponding line segment path. The algorithm implemented by this object when processed defines the aircraft's travel to first proceed to positional point P1, then to travel along the earth's great circle to the positional point P2. The curvature evident in the geometric rendering of this line segment reflects the fact that the aircraft traveling in this manner maintains a great circle path along the Earth's surface.

The line segment path object designated L2 of FIG. 2B is expressed in terms of the defining parameters P1, c, and d. When processed, this object simply defines the aircraft's travel first to proceed to positional point P1, then to proceed from that point at a course c over a distance d at constant altitude.

Referring to the turn path objects of FIGS. 3A–F, FIG. 3A illustrates a turn object designated T1 and expressed in terms of the defining parameters P1, P2, and P3. When processed, this object defines the aircraft's path of travel first to positional point P1, then directly to positional point P3, followed by a turn sufficient to align the aircraft's course with the positional point P2 and travel on course thereafter directly to that positional point P2.

Figure 3A:
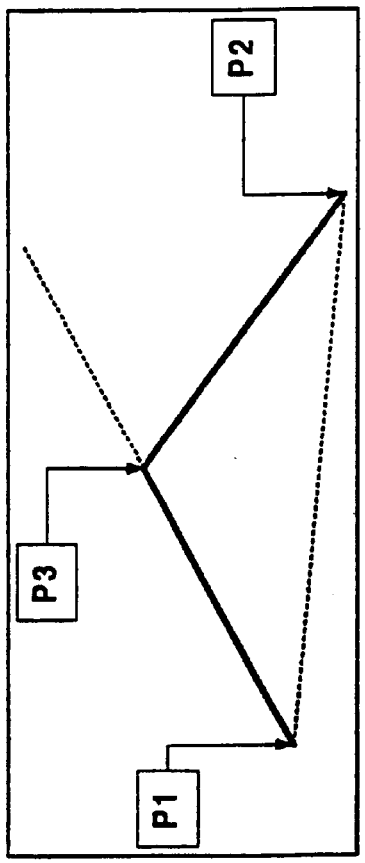
FIG. 3A is an illustration of a first exemplary turn path component that may be rendered by a path object in accordance with the present invention.
Figure 3B:
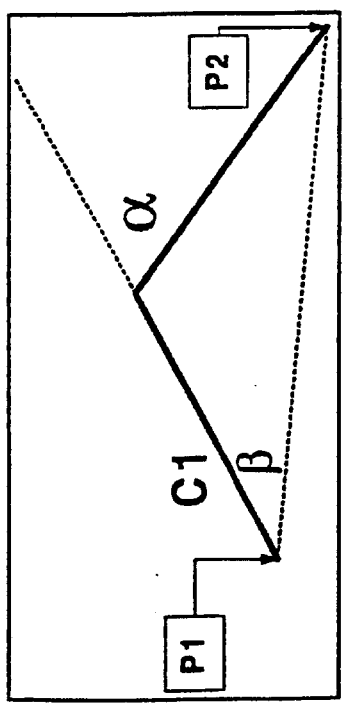
FIG. 3B is an illustration of a second exemplary turn path component that may be rendered by a path object in accordance with the present invention.

FIG. 3B illustrates a turn path object designated T2 and expressed in terms of defining parameters which include P1, P2, β, and α. When processed, this path object defines the aircraft's path of travel first to the positional point P1, then along a heading β relative to the vector defined between the starting point P1 and the eventual ending positional point P2. The path object thus defines the aircraft's travel along the heading β until the change in heading necessary for the aircraft to subsequently head directly for the point P2 equals α. The path object defines the aircraft's travel, at that time, to turn and proceed directly to the positional point P2.

Figure 3C:
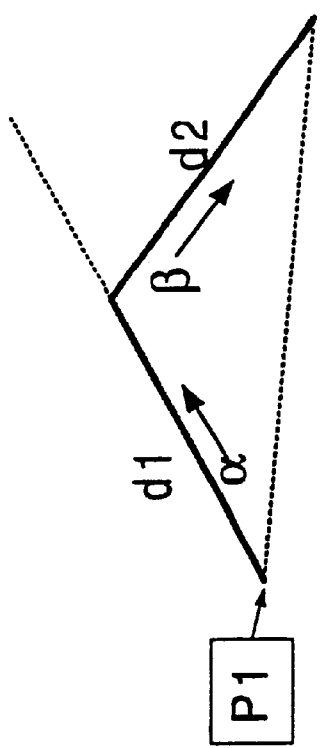
FIG. 3C is an illustration of a third exemplary turn path component that may be rendered by a path object in accordance with the present invention.

FIG. 3C illustrates a turn path object designated T3 expressed in terms of defining parameters which include P1, α, d1, β, and d2. This path object defines the aircraft's path of travel to proceed at constant altitude first to the positional point P1, then along a magnetic course α over a distance d1. It next defines the travel to turn in order to assume a magnetic course β, and to travel from that point a distance d2.

Figure 3D:
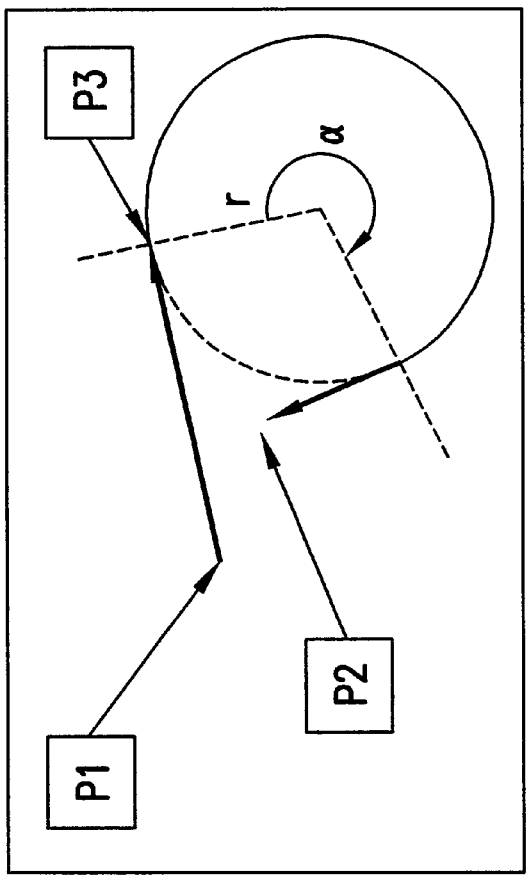
FIG. 3D is an illustration of a fourth exemplary turn path component that may be rendered by a path object in accordance with the present invention.

FIG. 3D illustrates a turn path object designated T4 and expressed in terms of defining parameters which include P1, P2, P3, and r. The path object, when processed, defines the aircraft's path of travel first to positional point P1, then directly to the positional point P3. It then defines the path of travel to proceed from that point P3 along a circle of radius r tangentially intersected by the vector extending between points P1 and P3 until the aircraft's course is aligned with the point P2. The path object then defines the path of travel directly therefrom to the positional point P2.

Figure 3E:
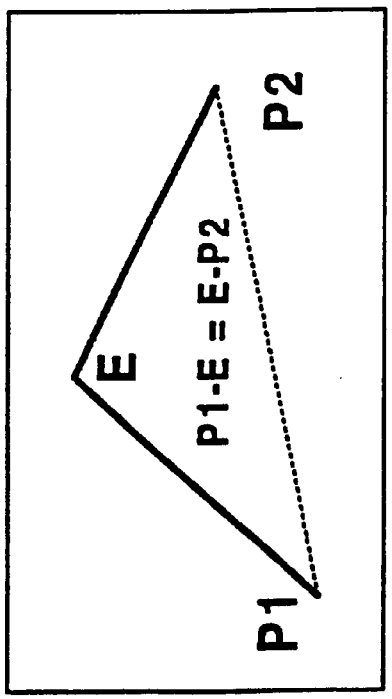
FIG. 3E is an illustration of an exemplary path extension path component that may be rendered by a path object in accordance with the present invention.

FIG. 3E illustrates a path extension type of turn path object designated Dly2 and expressed in terms of defining parameters that include P1, P2, and D. This path object defines the aircraft's path of travel first to the positional point P1, then to an intermediate positional point E, and thereafter to the positional point P2. The intermediate positional point E is one which satisfies the following equalities:

$$|P1-E|=|E-P2|$$

$$|P1-E|=[D+|P1-P2|]/2,$$

where:

D denotes a preset constant value.

Figure 3F:
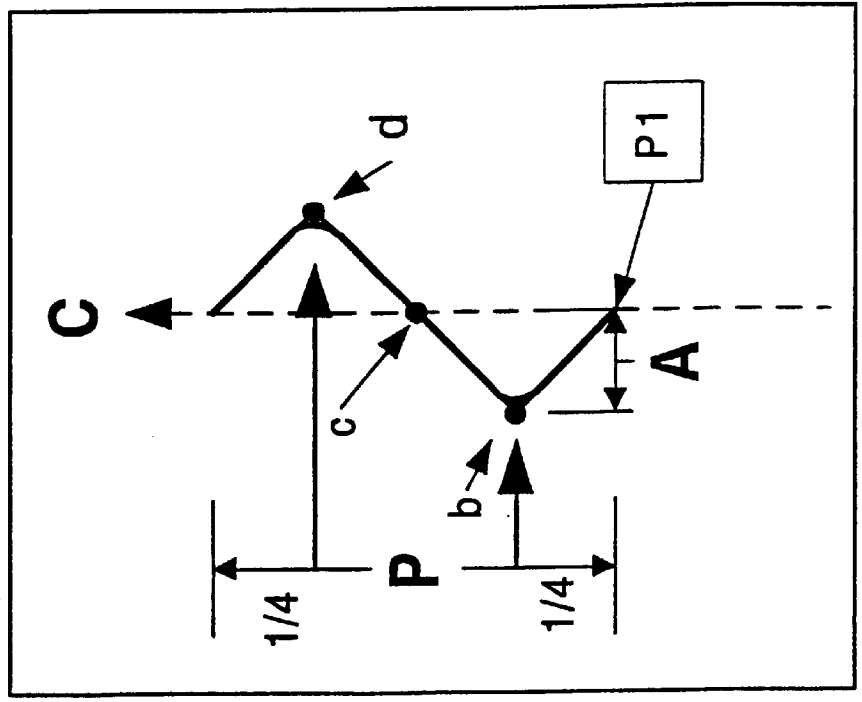
FIG. 3F is an illustration of an exemplary S-turn maneuver path component that may be rendered by a path object in accordance with the present invention.

FIG. 3F illustrates a more complex turn path object, an S-turn maneuver path object, designated ST1 and expressed in terms of defining parameters which include P1, A, P, and C. This path object defines the aircraft's path of travel to first proceed to positional point P1, to then progress through an S-shaped maneuver positioned and oriented with reference to a course C projected from point P1, and to thereafter reassume course C. The S-maneuver path is defined by three points, b, c, and d. The first of these intermediate points, point b, is displaced from point P1 by a distance having a component of transverse offset from course C equaling A and a component of offset along course C equaling ¼ P, where P represents the total distance to be covered along course C by the S-maneuver. The second intermediate point c is located on course C but offset from the first intermediate point b along course C by the distance ¼ P. The third intermediate point d is displaced from the second intermediate point c by a transverse offset component equaling A and an offset component along course C equaling ¼ P. The final leg of the S-turn maneuver extends from that point back to course C while advancing in the direction of that course C by the distance ¼ P.

At each of the first and third intermediate points b, d, the aircraft's path of travel traces a smooth arcuate segment rather than a sharp, abrupt turn. The specific properties of each turn may be selected and implemented in accordance with the requirements of a specific application.

Figure 4A:
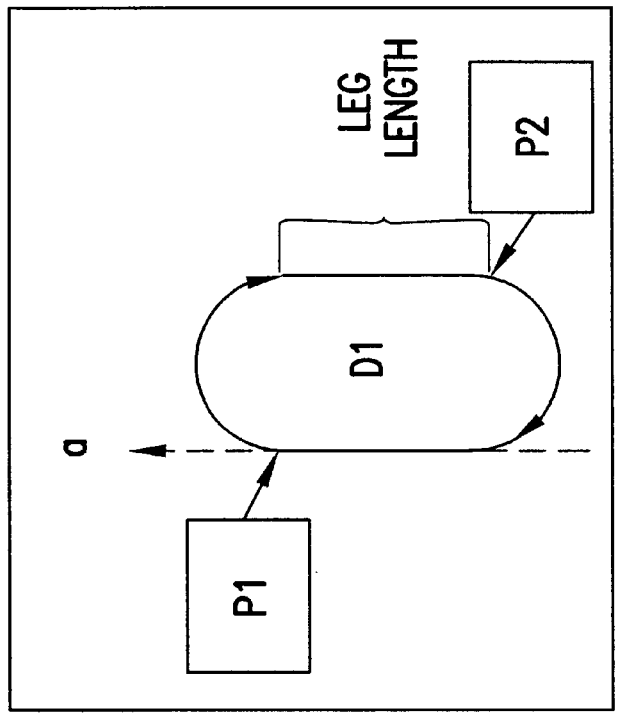
FIG. 4A is an illustration of an exemplary holding pattern path component that may be rendered by a path object in accordance with the present invention.

Turning next to the exemplary holding pattern path objects illustrated in FIGS. 4A–D, the first is shown in FIG. 4A. It is designated R1 and expressed in terms of defining parameters that include P1, P2, and a. When processed, this path object defines the aircraft's path of travel to proceed first to point P1 along a course a, then along a semi-circular arc of diameter D1, which is derived as the width of a rectangle diagonally defined by points P1 and P2. The path object next defines the path of travel directly to, and thereafter back to course a via a second semi-circular arc of diameter D1. At that point, the path object defines the aircraft's travel along course a to point P1. It then defines a repetition of this path where necessary.

Figure 4B:
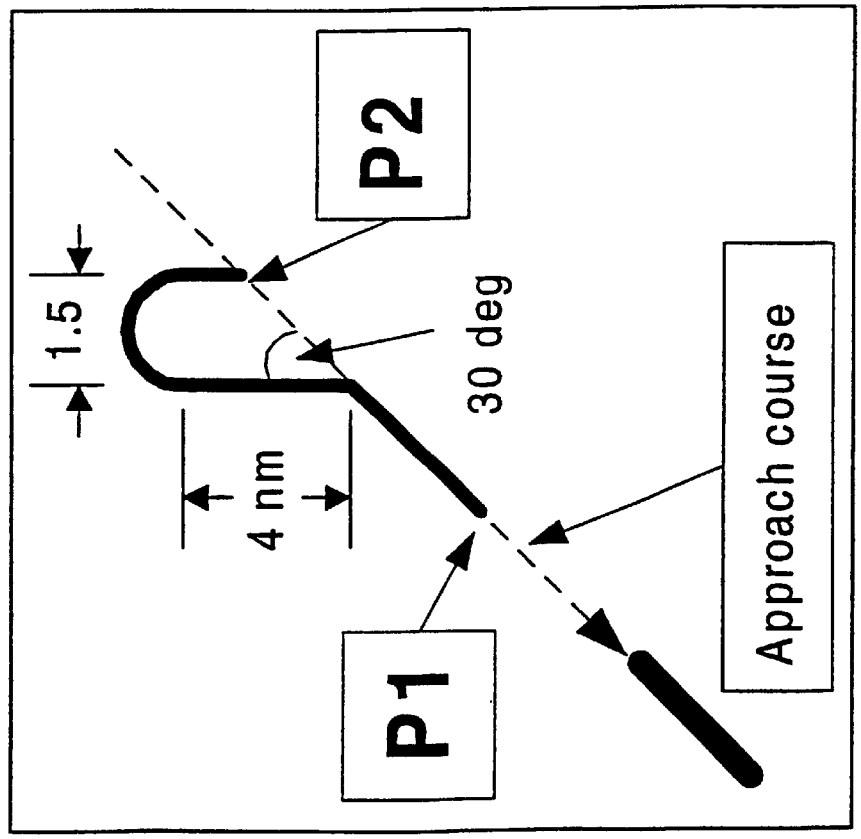
FIG. 4B is an illustration of an exemplary procedure turn path component that may be rendered by a path object in accordance with the present invention.

FIG. 4B illustrates a procedure turn path object designated PT1 and expressed in terms of defining parameters that include P1 and P2. The path object defines the aircraft's path of travel first to positional point P1, then directly towards the positional point P2 until a separation distance from point P2 reaches 3 nm. It defines a change in course at that point by 30° (to the left) followed by subsequent travel on that course over a 4 nm distance. The path object next defines a change in course (to the right) by 180° by following a semi-circular arc of 1.5 nm diameter. It defines the travel thereafter directly to point P2, at which point it defines a turn towards point P1 and subsequent travel directly to that point P1.

Figure 4C:
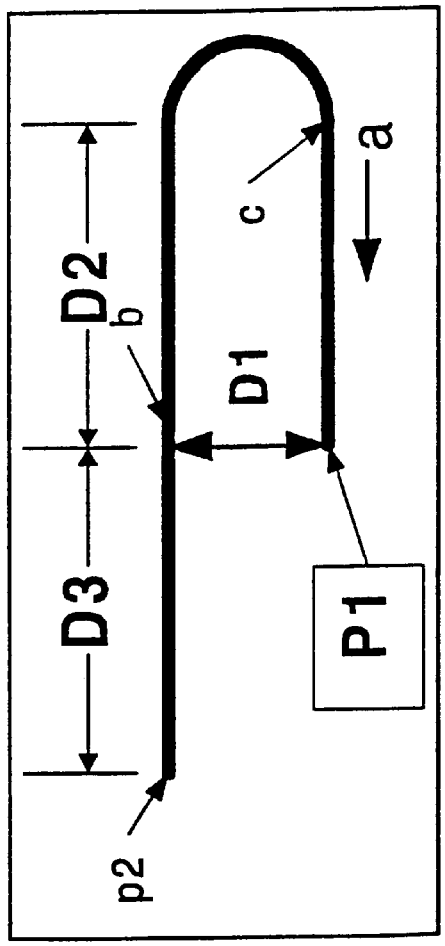
FIG. 4C is an illustration of an exemplary traffic pattern path component that may be rendered by a path object in accordance with the present invention.

FIG. 4C illustrates a traffic pattern path object designated TP and expressed in terms of defining parameters that include P1, a, D1, D2, and D3. The path object initially effects the computation of an intermediate point b with reference to the ultimate destination point P1, the course a by which the path is to ultimately approach point P1, and D1, the transverse separation distance (relative to course a) between points b and P1. From the values of b, a, and D3—the approach distance between points p2 and b—the object defines the path of travel first to positional point p2, then directly to point b. It then defines the path of travel to extend beyond point b by a distance D2, then to follow a semi-circular arc of diameter D1, and to thereafter proceed directly to point P1 along course a.

Figure 4D:
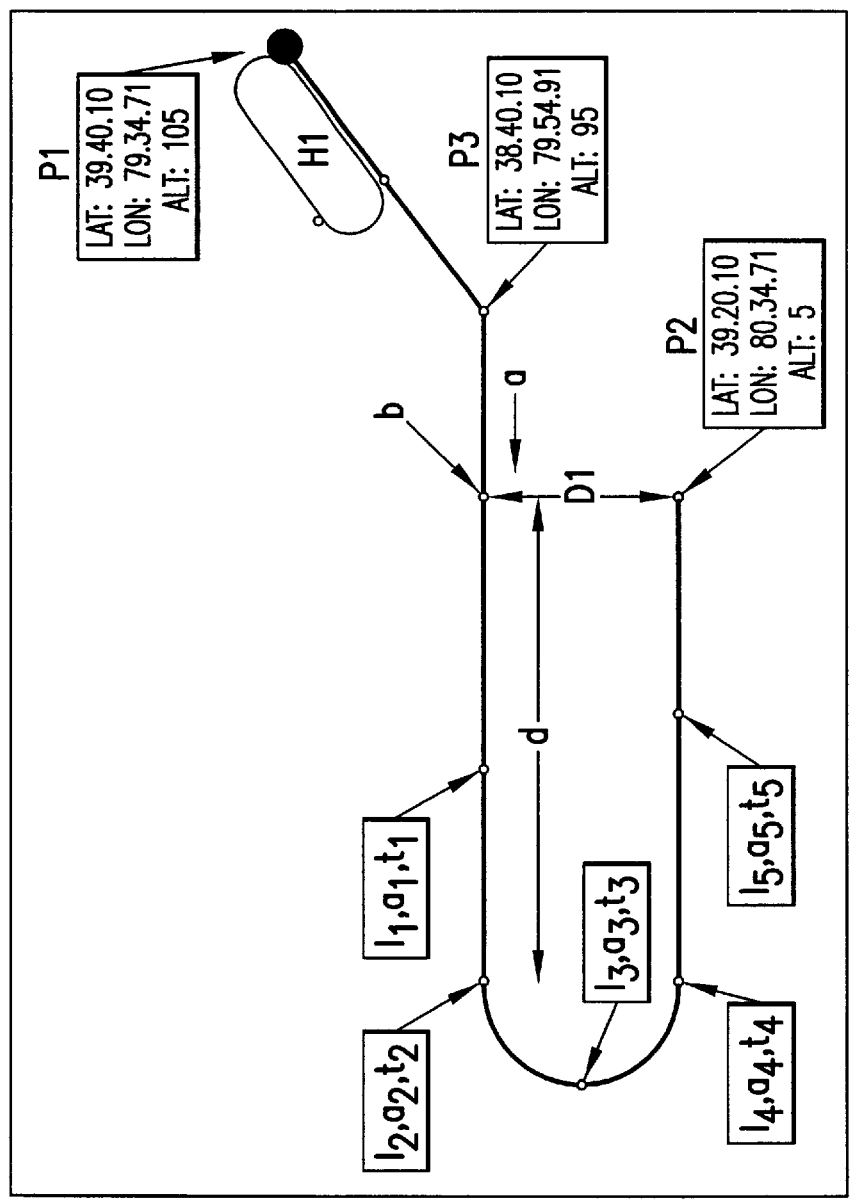
FIG. 4D is an illustration of an exemplary standard instrument arrival route path component that may be rendered by a path object in accordance with the present invention.

FIG. 4D illustrates a generalized standard instrument arrival route pattern (STAR) path object designated ST1 and expressed in terms of defining parameters that include P1, P2, P3, a, d, h, $l_1$, $a_1$, $t_1$, $l_2$, $a_2$, $t_2$, . . . , $l_n$, $a_n$, $t_n$. The STAR path object defines the aircraft's path of travel first to positional point P1. If the flag parameter h is set to a predetermined value such as 1, the path proceeds into the holding pattern H1. When the holding pattern H1 is concluded, the path proceeds directly to positional point P3, and calculation of the transverse offset distance between positional point P2, the ultimate destination, and the course a extending from positional point P3, the path object defines the path of travel to extend on course a beyond intermediate point b (the point of perpendicular projection of point P2 onto course a) by a distance d. It then defines the path to proceed along a semi-circular arc having the diameter D1, and to thereafter proceed directly to point P2.

Measures are taken to observe and effect altitude requirements along the path of travel. The parameters $l_i$ at intermediate points along the path represent the respective distances from point P1 along that path. The parameters $a_i$ represent the respective altitudes at those intermediate points; and, the parameters $t_i$ represent the parameter type indicators corresponding to the particular $l_i$ and $a_i$ parameters associated therewith. The parameter types indicated may, for example, include: 1 to denote "at;" 2 to denote "at or above;" 3 to denote "at or below;" and, 4 to denote "suggested."

As noted already in preceding paragraphs, each of the path objects illustrated in FIGS. 2A–B, 3A–F, and 4A–D and others suitable for the intended application may be realized employing any suitable programming technique known in the art; in any suitable programming language known in the art, and in accordance with any suitable standards/protocol known in the art. The path object processing function is adapted accordingly to generate output signals readily recognizable and readable to the navigation control system of the given host vessel. As the format and configuration of such output signals will depend quite heavily upon the specific requirements and capabilities of the navigation control system in question, such is not described any further herein.

Figure 5:
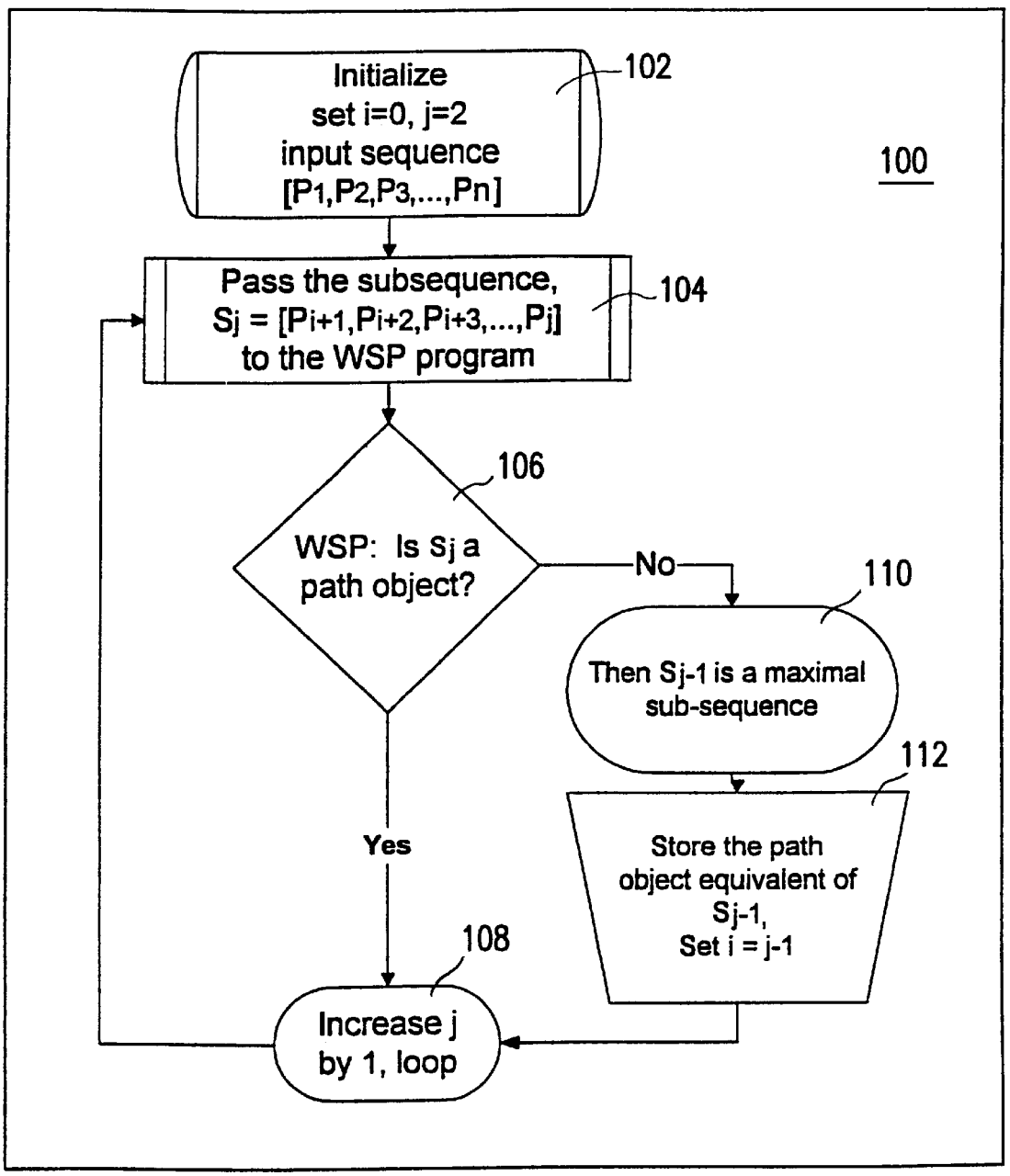
FIG. 5 is a flow diagram illustrating the operation of a path object generation function in one embodiment of the present invention.

Referring next to FIG. 5, there is shown in greater detail the operations generally carried out in one embodiment of path object generation unit 100. Path object generation unit 100 preferably operates to examine progressively defined subsequences of an input way point sequence $[P_1, P_2, \ldots, P_n]$ received thereby in order to identify a maximum subsequence—the longest subsequence mapping to one of a predetermined set of path objects. It continues the process until the entire sequence of input way points is expressed in terms of one or a series of path objects. The path objects are then passed to path object processor 125 for selective processing thereof.

Path object generation unit 100 includes in the embodiment shown a functional block 102 wherein iterative parameters i, j, are set respectively to the integer values 0 and 2; and, the input way point sequence $[P_1, P_2, \ldots, P_n]$ is read. The operative flow then passes to block 104 wherein the subsequence defined in accordance with the current values is identified and passed to a way point sequence processing block 106 to determine whether or not the subsequence $S_j$ correlates to a recognizable path object type. If a correlation is found, the flow proceeds to block 108 at which the iteration parameter j is increased by 1, and the flow is looped back to block 104. Way point sequence processing of the next longest subsequence is there conducted in an effort to identify the correlated subsequence's end point.

If at block 106 it is determined that the current subsequence $S_j$ does not correlate to a recognizable path object, the flow is passed to block 110. At block 110, it is noted that the preceding subsequence $S_{j-1}$ constitutes a maximum subsequence. This, of course, contemplates that any two points of the given sequence correlates at least to the simplest of the available path object types (such as a line segment type). Where this is not necessarily the case, the flow may proceed differently.

The flow in the embodiment at hand proceeds from block 110 to block 112 wherein the path object equivalent of the maximal subsequence is appropriately stored as such, and the iteration parameter i is set to the value of j−1. The flow then passes to block 108 wherein the iteration parameter j is incremented. From block 108, the flow loops back to block 104.

Once a series of path objects $[PO_1, PO_2, \ldots, PO_k]$ is thus derived, each adjacent pair of path objects is examined to determine whether or not they may be further combined to generate a single recognizable path object. If so, the combinable path objects are combined, and the number of path objects in the series is decremented accordingly.

Figure 6:
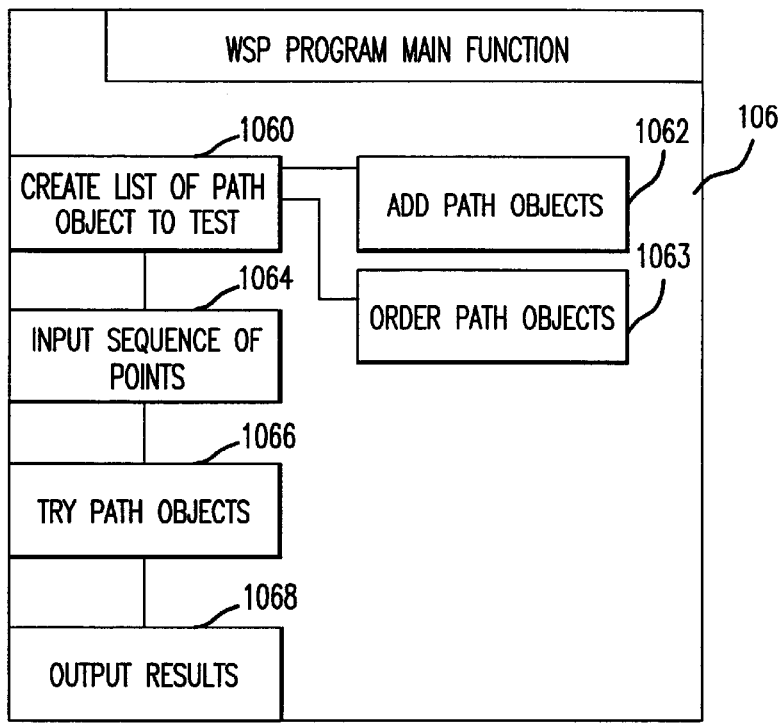
FIG. 6 is a flow diagram illustrating the operation of one portion of the flow diagram shown in FIG. 5.

Way point sequence processor (WSP) 106 is next described in greater detail with reference to FIG. 6. WSP 6 operates generally to attempt fitting one of the predetermined path objects to a given subsequence $S_j$. Where a sufficient fit is found, WSP 106 derives the resulting path object's defining parameters, preferably saving them in a text file. In the embodiment shown in FIG. 6, WSP 106 includes a functional block 1060 wherein a list of path objects for testing a subsequence against is created. Block 1060 accesses block 1062 which executes the measures necessary to add path objects and block 1063 which executes the measures necessary for appropriately ordering them. The operational flow passes from block 1060 to blocks 1064, then 1066, whereby the given subsequence $S_j$ of way points is read, and the measures necessary for attempting a fit of the listed path objects thereto are subsequently executed. Results from the testing at block 1066—either the identification of a fitting path object or a null pointer indicating the absence of any sufficient fit—are passed for output at block 1068.

Figure 7:
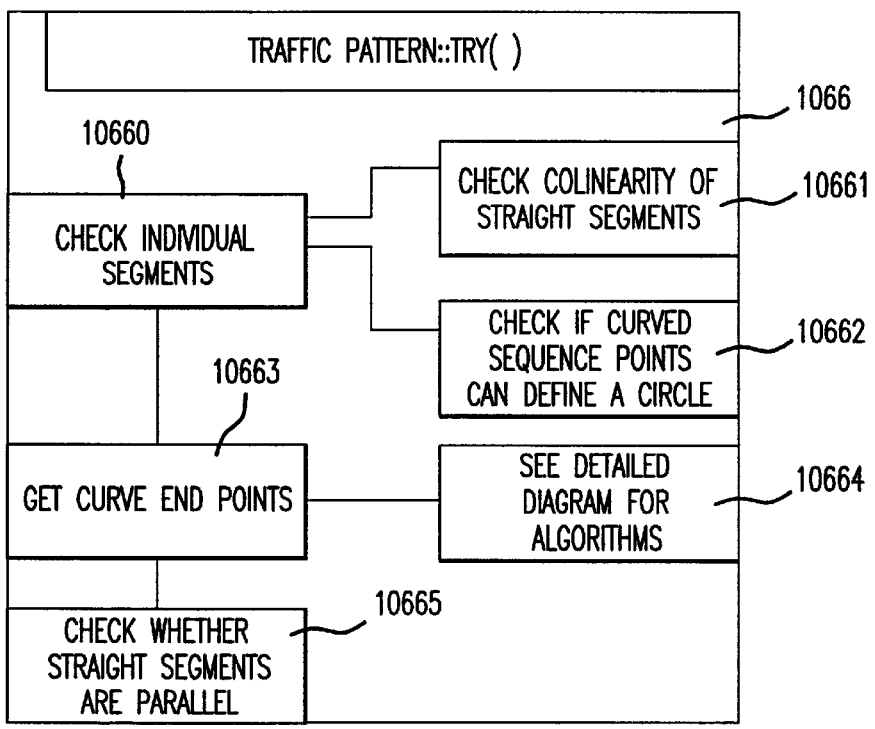
FIG. 7 is a flow diagram illustrating the operation of one portion of the flow diagram shown in FIG. 6.

Examples of the path object testing measures executed at block 1066 of WSP 106 are next described for illustrative purposes. One example illustrated in FIG. 7 is found in a computer executable routine denoted "Traffic Pattern: Try[ ]," which tests a given subsequence $S_j$ for possible fit with a traffic pattern path object such as shown in FIG. 4C. Recognizing that a traffic pattern path object generally includes three basic geometric segments: a pair of parallel straight segments and a semi-circular arc at whose end points the straight segments are coupled; the routine first generates a list of all possible combinations by which the way points of a given subsequence $S_j$ may be assigned to the geometric segments. One example of such a list for the case where the given subsequence $S_j$ includes five way points is shown in Table 1.

TABLE 1

Traffic Pattern Assignment Combinations: 5 Point Case

| Combination | entering | curve | exiting |
|---|---|---|---|
| 1 | 5 | 0 | 0 |
| 2 | 4 | 1 | 0 |
| 3 | 4 | 0 | 1 |
| 4 | 3 | 2 | 0 |
| 5 | 3 | 1 | 1 |
| 6 | 3 | 0 | 2 |
| 7 | 2 | 3 | 0 |
| 8 | 2 | 2 | 1 |
| 9 | 2 | 1 | 2 |
| 10 | 2 | 0 | 3 |
| 11 | 1 | 4 | 0 |
| 12 | 1 | 3 | 1 |
| 13 | 1 | 2 | 2 |
| 14 | 1 | 1 | 3 |
| 15 | 1 | 0 | 4 |
| 16 | 0 | 5 | 0 |
| 17 | 0 | 4 | 1 |
| 18 | 0 | 3 | 2 |
| 19 | 0 | 2 | 3 |
| 20 | 0 | 1 | 4 |
| 21 | 0 | 0 | 5 |

Referring to the flow diagram of FIG. 7, the routine evaluates for each combination of way point assignments at block 10660 the feasibility of the way points belonging to the geometric segments to which they are respectively assigned. This evaluation is performed without regard for the intercoupling of the segments—that is, by simply evaluating whether or not the points assigned to a particular path segment could concurrently belong to that segment, regardless of how that segment might be oriented or positioned (relative to the other segments) when fitted to its assigned points. The way points assigned to the entering and exiting straight segments of the traffic pattern path, for example, are tested simply for relative colinearity at block 10661, while those points assigned to the semi-circular arc are simply tested at block 10662 to determine if they in fact define such an arcuate shape.

Where feasibility is not found for any of the geometric segments, the combination is discarded from further consideration as a possible assignment of points for the given traffic pattern path, and the next combination of assignments is evaluated. Where feasibility is found for each of the individual segments, measures are taken at block 10663 to discern the end points of the segments. Such measures at block 10663 include defining a circle containing the traffic pattern path's semi-circular arc segment. To that end, the selected combination of way point assignment to the path segments are classified within one of five general cases illustrated in Table 2.

TABLE 2

| Cases for GetCurveEndPoints | | |
| --- | --- | --- |
| case | curve points | defined segment |
| 1 | 1 | Y |
| 2 | 1 | N |
| 3 | 2 | Y |
| 4 | 2 | N |
| 5 | >=3 | either |

A way point assignment combination's classification into one of the five cases shown is based in part on the number of way points in the combination actually assigned to the semi-circular arc, and in part on whether or not at least one of the other segments—the straight entry and exit segments—is sufficiently defined (by having at least two way points assigned thereto). The routine then selects and executes at block 10664 a separate geometric process (described in following paragraphs) depending on the classification that is made. If a circle containing the semi-circular arc may be defined, the selected geometric process returns the end points corresponding to that semi-circular arc, and a check is made at block 10665 as to whether or not the entry and exit segments are substantially parallel. A check is also made as to whether or not all points of the subsequence, including the computed end points, fit on at least one segment of the traffic pattern path. If these checks are satisfied, the corresponding traffic pattern path object is created by setting the defining parameters of the appropriate general path object type. The created path object is then returned to the WSP function for further processing.

Exemplary geometric processes for respectively characterizing a possible semi-circular arc based on the available information are shown in FIGS. 8A–D. The geometric processes respectively correspond to cases 1–4 delineated in Table 2. The geometric process for the simplest case, case 5, wherein three points are assigned to the semi-circular arc component is not shown graphically, as a circle is uniquely defined by three or more of its points.

Each of the geometric processes shown yields, where possible, a characterization of the semi-circular arc best reconciling the information available for the given case. While not specifically indicated in the textual legends accompanying each of the graphic illustrations of the geometric processes, the end points may be readily determined once the semi-circular arc's characterization is made.

Referring back to FIG. 6, another example of a computer-executable path object test routine available at block 1066 of WSP 106 in the present embodiment is one which tests for a fit of the given subsequence points with a path stretching maneuver (a special case of the S-turn maneuver path type). The computer executable routine denoted, for instance, "PathStretching Maneuver: Try[ ]," first generates in the present embodiment the possible combinations of way point assignments to the path type's discernable segments. The routine does so in much the same manner as does the traffic pattern test routine described in preceding paragraphs. The geometric process graphically illustrated in FIG. 9 is then carried out to determine whether any assignment combination correlates to a path stretching maneuver. If any of the combinations does, a path stretching maneuver path object is created and returned to the WSP function for further processing.

Referring to FIG. 9, the geometric process evaluates various points of the point assignment combination, then characterizes the corresponding path stretching maneuver trace to include those points once it is determined that the test conditions are sufficiently satisfied. The process tests for such conditions as whether the first and last two adjacent points in the given subsequence are colinear, and whether or not the points apparently corresponding to the turn points b and e are disposed in equidistant manner and on opposing sides of the original course C. Where a path stretching maneuver is found, the defining parameters of the corresponding path object are set in accordance with the characterized maneuver shape and returned to the WSP function 106.

Tests for numerous other path objects may be similarly carried out, as needed. In fact, any suitable curve fitting geometric process may be carried out.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described; certain features may be used independently of other features; and in certain cases, particular combinations of method steps may be reversed or interposed, all without departing from the spirit or scope of the invention as defined in the appended Claims.

What is claimed is:

1. A method of automatically generating navigation route data for a vehicle comprising the steps of:
   (a) establishing a predefined reference system;
   (b) storing in computer readable form at least one path object having a type selected from a plurality of predetermined path object types, each said path object type corresponding to a distinct predefined path type, each said path object including:
      (1) a plurality of defining parameters for geometrically configuring said path type corresponding to said path object to define a specific path component; and,
      (2) a predetermined set of instructions for geometrically rendering said path component in accordance with said defining parameters; and,
   (c) selectively reading and executing at least one said path object to generate a composite navigation route formed by at least one said path component for guiding the travel of the vehicle.

2. The method as recited in claim 1 wherein step (c) includes the step of generating a series of way point coordinates within said reference system, said series of way point coordinates substantially describing said geometrically rendered path components of said executed path objects.

3. The method as recited in claim 1 wherein said path types corresponding to said predetermined path object types include at least one curvilinear geometric pattern and at least one polygonal geometric pattern.

4. The method as recited in claim 3 wherein each said predetermined set of instructions collectively prescribe a sequential trace of said corresponding path component.

5. The method as recited in claim 3 wherein said path types corresponding to said predetermined path object types include: a line segment, a turn, a path extension pattern, a maneuver pattern, a holding pattern, a procedure turn pattern, a traffic pattern, a generalized standard instrument arrival route pattern, and a generalized standard instrument departure route pattern.

6. The method as recited in claim 2 further comprising the step of converting said way point coordinates from said predefined reference frame to a local reference frame.

7. The method as recited in claim 6 wherein said predefined reference frame includes absolute latitude, longitude, and altitude coordinates.

8. The method as recited in claim 2 wherein a plurality of said path objects are read and executed to generate said series of way point coordinates, said series of way point coordinates substantially describing a composite route collectively defined by a plurality of said geometrically rendered path components.

9. The method as recited in claim 1 further comprising the steps of:
  (a) receiving a sequence of predefined way points indicative of the route to be traveled by the vehicle;
  (b) evaluating said sequence of predefined way points for correlation with said path types corresponding to said predetermined path object types;
  (c) selecting at least one path object type for said sequence of predefined way points responsive to said evaluation; and,
  (d) setting said defining parameters of said path object types selected to configure each into one said path object.

10. The method as recited in claim 9 wherein said step of evaluating said sequence of predefined way points includes the steps of:
  (a) testing a plurality of iteratively defined subsequences for correlation with said path types, each said subsequence containing a contiguous portion of said sequence;
  (b) identifying responsive to said testing each said subsequence correlated to one of said path types;
  (c) assigning to each said identified subsequence said path object type corresponding to said path type correlated therewith; and,
  (d) combining any adjacent subsequences collectively correlated to one of said path types.

11. The method as recited in claim 10 wherein said step of testing a plurality of said subsequences includes the step of performing for each said subsequence a curve fit analysis with reference to each of said path types corresponding to said predetermined path object types.

12. A method of dynamically generating navigation route data for a vehicle comprising the steps of:
  (a) establishing a predefined reference system;
  (b) establishing a plurality of predetermined path object types, each said path object type corresponding to a distinct predefined path type;
  (c) receiving a sequence of predefined way points indicative of the route to be traveled by the vehicle;
  (d) evaluating said sequence for correlation with said path types to select at least one said path object type therefor;
  (e) deriving from each said path object type selected and storing in computer readable form an executable path object, each said path object including:
    (1) a plurality of defining parameters for geometrically configuring said path type thereof to define a specific path component; and,
    (2) a predetermined set of instructions for geometrically rendering said path component in accordance with said defining parameters;
  (f) selectively reading and executing at least one said path object to generate a composite navigation route formed by at least one said path component; and,
  (g) passing said composite navigation route to a navigation control system of the vehicle.

13. The method as recited in claim 12 wherein said step of evaluating said sequence of predefined way points includes the steps of:
  (a) testing a plurality of iteratively defined subsequences for correlation with said path types, each said subsequence containing a contiguous portion of said sequence;
  (b) identifying responsive to said testing each said subsequence correlated to one of said path types;
  (c) assigning to each said identified subsequence said path object type corresponding to said path type correlated therewith; and,
  (d) combining any adjacent subsequences collectively correlated to one of said path types.

14. The method as recited in claim 13 wherein said step of testing a plurality of said subsequences includes the step of performing for each said subsequence a curve fit analysis with reference to each of said path types corresponding to said predetermined path object types.

15. The method as recited in claim 12 wherein step (f) includes the step of substantially recovering said sequence of said predefined way points from said composite navigation route.

16. The method as recited in claim 12 further comprising before step (f) the step of transmitting each said path object to the vehicle from a remote base station, steps (a) through (e) being executed at the remote base station.

17. The method as recited in claim 16 wherein step (f) includes the step of substantially recovering said sequence of said predefined way points from said composite navigation route.

18. The method as recited in claim 12 wherein said path types corresponding to said predetermined path object types include: a line segment, a turn, a path extension pattern, a maneuver pattern, a holding pattern, a procedure turn pattern, a traffic pattern, a generalized standard instrument arrival route pattern, and a generalized standard instrument departure route pattern.

19. A system for generating navigation route data for a vehicle comprising:
  (a) path object generator for generating responsive to a sequence of predefined positional coordinate points received thereby at least one computer executable path object indicative of a corresponding geometric path component, said path object generator having stored therein a plurality of predetermined path object types, said path object unit including a sequence processor operable to adaptively select and configure at least one of said path object types to form each said path object; and,
  (b) a path object processor operably coupled to said path object generator for receiving each said path object therefrom, said path object processor being operable to execute each said path object to render data for said path component corresponding thereto, said path object processor passing to a navigation control system of the vehicle composite navigation route data containing said path component data corresponding to each said path object.

20. The system as recited in claim 19 wherein said predetermined path object types include: a line segment type, a turn type, a path extension pattern type, a maneuver pattern type, a holding pattern type, a procedure turn pattern type, a traffic pattern type, a generalized standard instrument arrival route pattern type, and a generalized standard instrument departure route pattern type.

21. The system as recited in claim 19 wherein said sequence processor of said path object generator is operable to selectively define at least one subsequence of said predefined positional coordinate points to be tested for correlation to one of said predetermined path object types.

22. The system as recited in claim 21 wherein said path object generator further includes a plurality of test modules each selectively actuable by said sequence processor to evaluate said subsequence against a plurality of correlation criteria pertaining to a preselected one of said predetermined path object types, each said test module being operable responsive to said evaluation to generate data for characterizing one said path object for said subsequence.

23. The system as recited in claim 22 wherein said correlation criteria has incorporated therein a geometric curve fitting scheme.

24. The system as recited in claim 19 further comprising a point data recovery unit coupled to said path object processor for substantially recovering said sequence of predefined positional coordinate points from said composite navigation route data.

25. The system as recited in claim 19 wherein said path object generator and said path object processor are remotely disposed and operably coupled one to the other by a wireless data communications link.

* * * * *